United States Patent
Lee et al.

(10) Patent No.: US 12,049,977 B2
(45) Date of Patent: Jul. 30, 2024

(54) SPIRALLY HEATING SUBMARINE PIPELINE

(71) Applicant: KOREA MARITIME UNIVERSITY INDUSTRY-ACADAMIC COOPERATION FOUNDATION, Busan (KR)

(72) Inventors: Seung Jae Lee, Busan (KR); Seok Hee Yun, Busan (KR); Hae Jun Ji, Busan (KR); Seong Jae Kim, Anseong-si (KR); Seung Jae Lee, Busan (KR)

(73) Assignee: KOREA MARITIME UNIVERSITY INDUSTRY-ACADEMIC COOPERATION FOUNDATION, Busan (KR)

( * ) Notice: Subject to any disclaimer, the term of this patent is extended or adjusted under 35 U.S.C. 154(b) by 719 days.

(21) Appl. No.: 17/282,183

(22) PCT Filed: Aug. 6, 2019

(86) PCT No.: PCT/KR2019/009754
§ 371 (c)(1),
(2) Date: Apr. 1, 2021

(87) PCT Pub. No.: WO2020/071628
PCT Pub. Date: Apr. 9, 2020

(65) Prior Publication Data
US 2022/0010910 A1    Jan. 13, 2022

(30) Foreign Application Priority Data

Oct. 1, 2018 (KR) ........................ 10-2018-0116817

(51) Int. Cl.
| | | |
|---|---|---|
| *F16L 53/38* | (2018.01) | |
| *E21B 36/00* | (2006.01) | |
| *E21B 36/04* | (2006.01) | |
| *F17D 1/18* | (2006.01) | |
| *E21B 43/01* | (2006.01) | |

(52) U.S. Cl.
CPC ............ *F16L 53/38* (2018.01); *E21B 36/005* (2013.01); *E21B 36/04* (2013.01); *F17D 1/18* (2013.01); *E21B 43/01* (2013.01)

(58) Field of Classification Search
CPC ........ E21B 36/005; E21B 36/04; E21B 43/01; F16L 53/38; F17D 1/18; F24H 1/10
(Continued)

(56) References Cited

U.S. PATENT DOCUMENTS 3,706,872 A * 12/1972 Trabilcy ................. F16L 53/34
219/535
3,834,458 A * 9/1974 Bilbro ..................... B23P 15/26
165/185
(Continued)

FOREIGN PATENT DOCUMENTS

| CN | 201539231 U | 8/2010 |
| KR | 10-1108577 B1 | 1/2012 |

(Continued)

OTHER PUBLICATIONS

International Search Report for PCT/KR2019/009754 mailed Nov. 12, 2019 from Korean Intellectual Property Office.

*Primary Examiner* — Sang Y Paik
(74) *Attorney, Agent, or Firm* — Paratus Law Group, PLLC

(57) ABSTRACT

Disclosed is a spirally heating submarine pipeline including: a conduit which transports a high temperature high pressure fluid from a submarine oil well; and a heating unit disposed in a spiral structure inside based on an outer circumferential surface of the conduit. The heating unit includes an electric heating wire that is installed along the spiral structure to generate heat; a heat insulator that is installed in the form of fully surrounding the electric heating wire and preserves the generated heat; and a heat insulating cap for isolating the heat insulator from the conduit or the heat insulating layer (Continued)

and is provided so as to increase the temperature of the flow in the pipe to prevent the production of a pipe flow interfering material when the fluid is transported in the conduit.

4 Claims, 13 Drawing Sheets

(58) Field of Classification Search
USPC .......................................... 392/468, 478–489
See application file for complete search history.

(56) References Cited

U.S. PATENT DOCUMENTS

| | | | | |
|---|---|---|---|---|
| 3,991,822 | A * | 11/1976 | Morris | B21D 53/045 |
| | | | | 165/169 |
| 4,178,875 | A * | 12/1979 | Moschetti | B05B 13/06 |
| | | | | 118/712 |
| 5,908,267 | A * | 6/1999 | Schuring | B09C 1/06 |
| | | | | 588/253 |
| 6,955,221 | B2 | 10/2005 | Bursaux | |
| H2139 | H | 1/2006 | Moore | |
| 7,190,892 | B2 * | 3/2007 | Kertesz | F16L 53/38 |
| | | | | 392/468 |
| 2009/0107558 | A1 * | 4/2009 | Quigley | F16L 53/38 |
| | | | | 137/15.01 |
| 2015/0204613 | A1 * | 7/2015 | Perry | F16L 53/32 |
| | | | | 29/890.036 |

FOREIGN PATENT DOCUMENTS

| | | | |
|---|---|---|---|
| KR | 10-2017-0007597 A | 1/2017 | |
| KR | 10-2017-0034073 A | 3/2017 | |

* cited by examiner (a)            (b)

SPIRALLY HEATING SUBMARINE PIPELINE

CROSS-REFERENCE TO PRIOR APPLICATIONS

This application is a National Stage Patent Application of PCT International Patent Application No. PCT/KR2019/009754 (filed on Aug. 6, 2019) under 35 U.S.C. § 371, which claims priority to Korean Patent Application No. 10-2018-0116817 (filed on Oct. 1, 2018), which are all hereby incorporated by reference in their entirety.

BACKGROUND

The present invention relates to a spirally heating submarine pipeline capable of preventing wax and hydration from occurring within a submarine pipeline during fluid transportation from a submarine production plant, and more particularly, to a technology for a spirally heating submarine pipeline in which an electric heating wire having a semicircular shape is provided as a spiral structure while being disposed inside the pipeline so as to prevent the electric heating wire from protruding from an outer circumferential surface of a conduit, thereby improving thermal conductivity and a fluid flow in the pipe.

A marine plant is gradually progressing toward a deep sea. Therefore, the length of the pipeline that transfers crude oil and gas from a submarine oil well is inevitably increased. In the case of a flow in the pipe, crude oil and gas with high temperature and high pressure flow, but a high temperature difference is formed due to a low water temperature (about 4° C.) of external deep sea.

Generally, if the fluid condition is formed at a critical temperature (about 6° C. to 70° C.), wax is generated in the case of crude oil, and hydrate is generated in the gas. The generated materials are major factors that hinder the fluid flow in the pipe and ensure minimal flow assurance in consideration of these factors.

As a method of ensuring the minimal flow assurance, there are four methods of chemical, hydroelectric, removal, and thermal methods. Actually, there is a thermal method as a widely used method in a famous marine plant such as <TechnipFMC> and <Subsea 7>, which is excellent as compared with other technologies due to low equipment investment costs and low risk.

The thermal method is an electrical method using a heat transfer heater, and typically, includes a direct electrical heating (DEH) method and an electrical trace heating (ETH) method. The DEH method serves to increase the temperature of the entire pipe by applying a potential difference to both ends of the pipe, and the ETH method serves to partially increase the flow temperature in the pipe by installing the electric heating wire outside the pipe. However, the ETH technology is known to be much better in terms of equipment investment costs than the DEH and be greatly developed.

In prior arts using this ETH method, in US Patent Registration No. 6955221, there is disclosed an active heating submarine pipeline that includes pipes of hot water or other hot fluids.

However, there is a problem that a heating apparatus of the submarine pipeline according to the prior art has an unnecessary distance between the heating wire and the flow in the pipeline, so that the sufficient heat transfer is not performed. Further, due to the straight type pipeline, when the fluid is transferred across a long distance, there is a problem that since interference between fluid particles on the wall and fluid particles at the center of the pipeline is low, the heat transfer inside the flow is not smooth. As a result, high voltage is required for sufficient heat transfer, which will eventually require a high-capacity generator.

SUMMARY

The present invention has been derived to solve the problems of the prior art as described above, and an object of the present invention is to provide a spirally heating submarine pipeline capable of increasing thermal conductivity by at least reducing a distance between an electric heating wire and a flow in the conduit, increasing an area to be transferred with heat through a spiral structure, and allowing the heat transfer between the fluid particles to be more activated.

Further, another object of the present invention is to provide a spirally heating submarine pipeline capable of partially solving a pressure loss problem by maximizing a turbulent flow by a spiral structure when the pressure loss problem may occur by a friction coefficient of a conduit in the case of a long-range submarine pipeline.

Further, yet another object of the present invention is to provide a spirally heating submarine pipeline having an installation structure for effective maintenance of electric heating wires.

Objects to be solved by the present invention are not limited to the aforementioned objects, and other unmentioned objects to be solved by the present invention will be clearly understood to those skilled in the art from the following description.

According to an embodiment of the present invention, there is provided a spirally heating submarine pipeline including: a conduit which transports a high temperature high pressure fluid from a submarine oil well; and a heating unit disposed in a spiral structure inside based on an outer circumferential surface of the conduit, wherein the heating unit includes an electric heating wire that is installed along the spiral structure to generate heat; a heat insulator that is installed in the form of fully surrounding the electric heating wire and preserves the generated heat; and a heat insulating cap for isolating the heat insulator from the conduit or the heat insulating layer and is provided so as to increase the temperature of the flow in the pipe to prevent the production of a flow in the pipe interfering material when the fluid is transported in the conduit.

Further, the heating unit may be formed to protrude from an inner circumferential surface of the conduit toward a center of the conduit, and a fillet may be applied to an end extending from the conduit.

Further, the heating unit may be installed in the form of being inserted into the inner circumferential surface of the conduit dented in the same shape as the spiral structure and the heat insulating cap may be formed to coincide with the inner circumferential surface of the conduit to separate the electric heating wire and the heat insulator located in the pipe wall of the conduit from the fluid in the pipe.

Further, the heating unit may be installed in the form of being inserted into the outer circumferential surface of the conduit dented in the same shape as the spiral structure and the heat insulating cap may be formed to coincide with the outer circumferential surface of the conduit to separate the electric heating wire and the heat insulator located in the pipe wall of the conduit from the heat insulating layer, the conduit may be provided to protrude from the inner circumferential surface of the conduit to the center of the conduit in the same shape as the heating unit, and the protruding portion may have fillets applied to the inner circumferential surface of the conduit and the extending end.

Further, in the spiral structure, a distance between the spirals may be formed twice the diameter of the conduit, so that an angle with a horizontal axis may be 45° and the number of spirals may be 1.

According to the present invention, the spirally heating submarine pipeline of the present invention has an effect of effectively controlling the waxing and hydrating phenomenon of a flow in the pipe by at least reducing a distance between the electric heating wire and the flow in the pipe to maximize the thermal conductivity.

Further, the spirally heating submarine pipeline of the present invention has an effect of increasing the thermal conductivity by increasing an area to be heat-conducted through the spiral structure.

Further, the spirally heating submarine pipeline of the present invention has an effect of increasing the interference between fluid particles on the well and fluid particles at the center of the pipeline by maximizing a turbulent flow by a spiral structure to allow the heat transfer in the flow to be more activated and using a booster of a reduced capacity by reducing the pressure loss.

Further, according to the spirally heating submarine pipeline of the present invention, it is possible to ultimately improve the thermal conductivity to require a lower voltage than in the prior art and reduce initial cost by eventually requiring a low-volume generator.

Further, the spirally heating submarine pipeline of the present invention has an effect of reducing pigging cycles by enhancing thermal conductivity and cause reduction of equipment investment costs by increasing production stability.

DETAILED DESCRIPTION

Figure 1:
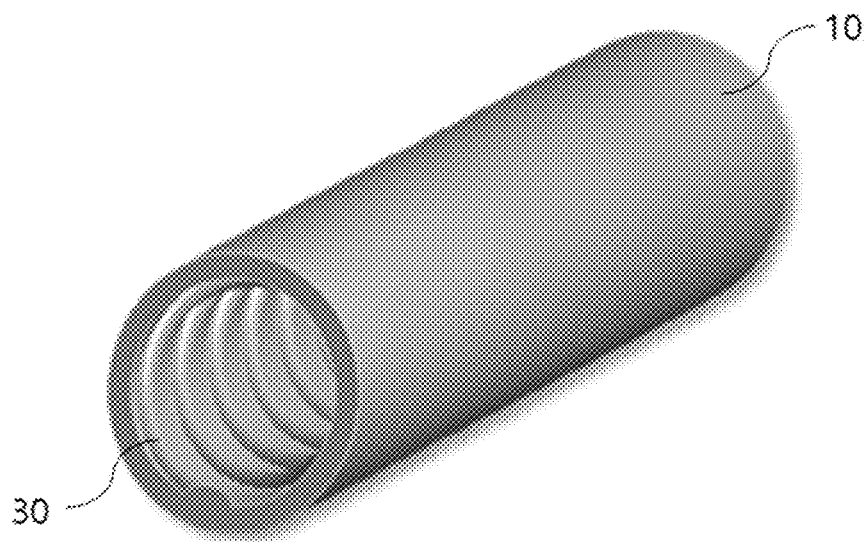
FIG. 1 is a perspective view of a spirally heating submarine pipeline according to a first embodiment of the present invention.

Specific matters including problems to be solved for the present invention, a solving means of the problems, and the effect of the invention for the present invention are included in exemplary embodiments and drawings to be described below. Advantages and features of the present invention, and methods for accomplishing the same will be more clearly understood from exemplary embodiments described in detail below with reference to the accompanying drawings.

The present invention relates to a spirally heating submarine pipeline capable of increasing the thermal conductivity between an electric heating wire and a flow in the pipe and exhibiting a flow improvement effect due to a spiral structure by developing an ETH method which prevents wax and hydrate which are pipe flow interfering materials by installing an existing electric heating wire outside a conduit to introduce the spiral structure in which the electric heating wire is located in the conduit.

As illustrated in FIGS. 1 to 5, a fatigue damage calculation system for a marine structure according to the present invention includes a conduit 10 which transfers a fluid of high temperature and high pressure from a submarine oil well; a heat insulating layer 20 provided in the form of surrounding the outside of the conduit 10 to preserve the heat in the conduit 10; and a heating unit 30 disposed in a spiral structure on the inner side based on an outer circumferential surface of the conduit 10. Here, the high temperature high pressure fluid may be other fluids as well as energy resources such as crude oil and petroleum gas.

First, the conduit 10 is for transferring energy resources produced from the submarine oil well, and generally, an outer diameter of the pipe used in production of crude oil is 12 inches, and a material may be made of ASTM A691 as carbon steel used for high temperature and high pressure.

Next, since the outside of the conduit 10 is in contact with the submarine of a low water temperature, the heat insulating layer 20 is a minimum means provided for preventing the temperature drop in the conduit 10. In addition, the heat insulating layer 20 may be easily formed in a replacement or detachable structure to maintain the heating unit 30 to be described below according to a situation.

Next, the heating unit 30 includes an electric heating wire 31 that is installed along the spiral structure to generate heat; a heat insulator 32 that is installed in the form of fully surrounding the electric heating wire 31 and preserves the generated heat; and a heat insulating cap 30 for isolating the heat insulator 32 from the conduit 10 or the heat insulating layer 20.

The heating unit 30 formed of the above-described configuration is provided to increase the temperature the flow in the pipe in order to prevent the production of a pipe flow interfering material such as wax or hydrate when a fluid such as crude oil or petroleum gas is transported inside the conduit 10.

Further, since the heating unit 30 may improve the thermal conductivity between the electric heating wire 31 and the fluid, a voltage requirement for operating the electric heating wire 31 will be less small, and since a generator of a low capacity is sequentially allowed, it is possible to expect the reduction of the equipment investment costs.

Hereinafter, an embodiment of the heating unit 30 of the spirally heating submarine pipeline according to the present invention will be described in detail with reference to FIGS. 1 to 5.

At this time, before the description, the conditions of the actual oil well and conduit are applied to demonstrate the verticality to a variable of the spirally heating submarine pipeline.

1. Selection of Oil Well

In the present invention, a condition of the actual oil well which is a Visund Field of Norwegian North Sea is applied to more enhance verticality. The Visund field has a condition of a depth of 355 m, crude oil production of 100.000 bpd (barrel per day), a temperature of 115° C. and a pressure of 270 bar.

2. Selection of Outer Diameter, Material, Thickness of Conduit

The outer diameter and material of the conduit 10 will be applied to 12 inches and ASTM A691, respectively, according to a marine construction recording. In the case of the outer diameter, the most common 12 inches among outer diameters of the conduit used in production of crude oil was selected, which was also the maximum outer diameter to which an existing technology, ETH may be applied. The material is carbon-based iron used for high temperature and high pressure, to withstand the extreme environment of marine construction. Similarly, in the case of the thickness of the periphery, the objectivity and the universality were satisfied through ASME B31.3 (Process Piping) that calculates the thickness in consideration of the strength to meet pipes for crude oil production and Schedule Number which is the thickness calculation standard. Here, since the calculation result by ASME B31.3, such as the following Equation 1 is a value that does not consider corrosion and erosion of actual production and extreme marine environment, this value is satisfied by selecting SCH 140.

$$t = \frac{PD}{2(SEW + PY)} \quad \text{[Equation 1]}$$

Here, P represents a pressure 270 bar (=27 MPa) of the oil well, D represents an outer diameter 12 inches (=304.8 mm) of the conduit, S represents a standard tensile allowable stress 25 ksi (=172.4 MPa) for metal. E represents a reference quality variable 1 (Seamless) for a pipe welding part. W represents a welding joint strength reduction variable 1 (Carbon Steel), Y is set to 0.4, which is a thickness adjustment coefficient for the diameter of the pipe, and t is calculated as a thickness of 22.46 mm. By applying these conditions to SCH140, 28.58 mm is derived, and the selected pipe wall thickness is determined as 28.58 mm.

3. Flow Rate in Pipe

A flow rate in the pipe may be selected by dividing a flow path area of the conduit from the crude oil production of the selected oil well, and the production of the crude oil and the flow path area of the conduit area calculated as 0.185 m³/s and 0.0482 m², respectively, when converted to a Si unit system. However, as the ideal calculation value, since the flow in the actual pipeline has a decreased velocity due to friction on the pipe wall and the applications, the velocity will be determined by 3.5 m/s in consideration of the decrease in flow rate of about 10%.

The derived flow rate in the pipe was compared with the Norsok Standard Code used universally used in the marine industry to verify the objective. In P-001 of Norsok Standard Code, the maximum flow rate in the pipe is defined and recommended, and since the maximum flow rate is presented at 5 m/s, 3.5 m/s, which is an estimated value, will be stable.

4. Selection of ANSYS Fluent Model

A Reynolds number of the flow in the pipe may be calculated to select an analysis model required for analysis. The Reynolds number is calculated to 14,759 by applying the selected pipe flow value, the inner diameter of the conduit, and the viscosity and density of crude oil, and this value is 2300 or more, which corresponds to a turbulent flow.

Thus, in an RANS model, a turbulent flow analysis model, a standard K-ε (SKE) model used in the engineering field was selected. However, in the case of a SKE model, since the flow analysis in the pipe wall is incorrect, an Enhanced Wall Treatment to perform the analysis by finely dividing layers near the pipe wall is additionally selected to enhance the analysis accuracy.

5. Selection of Valid Conduit Length

Since a simulation value from a point where a fully developed flow is formed in an ANSYS fluent is determined as a credible material, the point where the fully developed flow is formed is calculated to select a valid conduit length. The point if forming the fully developed flow is calculated by the following Equation 2 in turbulence, and as a result, the point is determined to be 5.4 m.

$$\frac{L_e}{D} \approx 4.4(Re)^{\frac{1}{6}} \quad \text{[Equation 2]}$$

Here, Re represents a previously calculated Reynolds number or 14,759, and D represents an inner diameter of 0.2478 m.

As a result, the length corresponding to 5.4 m or more was selected, 20 ft (6.096 m) was selected as a basic length according to an universally used criteria in marine construction, and 40 ft and 60 ft were additionally selected for high comparative analysis. In addition, 500 m, which is the maximum implementable length in the ANSYS fluent, was also added.

6. Friction on Pipe Wall

A velocity difference between the vicinity of the pipe wall and the center is accumulated so that the actual flow in the pipe proceeds in a longitudinal direction due to the friction on the pipe wall. In addition, since the friction on the pipe wall is directly related even to the pressure reduction, in the flow improvement as the problem to be solved in the present invention, it may be determined that the flow is also improved when the pressure reduction is improved.

Meanwhile, the ANSYS Fluent Model used as the analysis model of the present invention may derive a velocity profile, and in the flow in the pipe, an open form of a velocity profile graph of a turbulence flow is changed according to the friction coefficient. Specifically, the smaller a coefficient of friction of a smooth pipe, the higher a velocity increase in the pipe wall, and considering that a difference between the maximum velocity and the minimum velocity is small, variables that are derived from a velocity graph having an open form similar to the smooth pipe will be selected.

Figure 2:
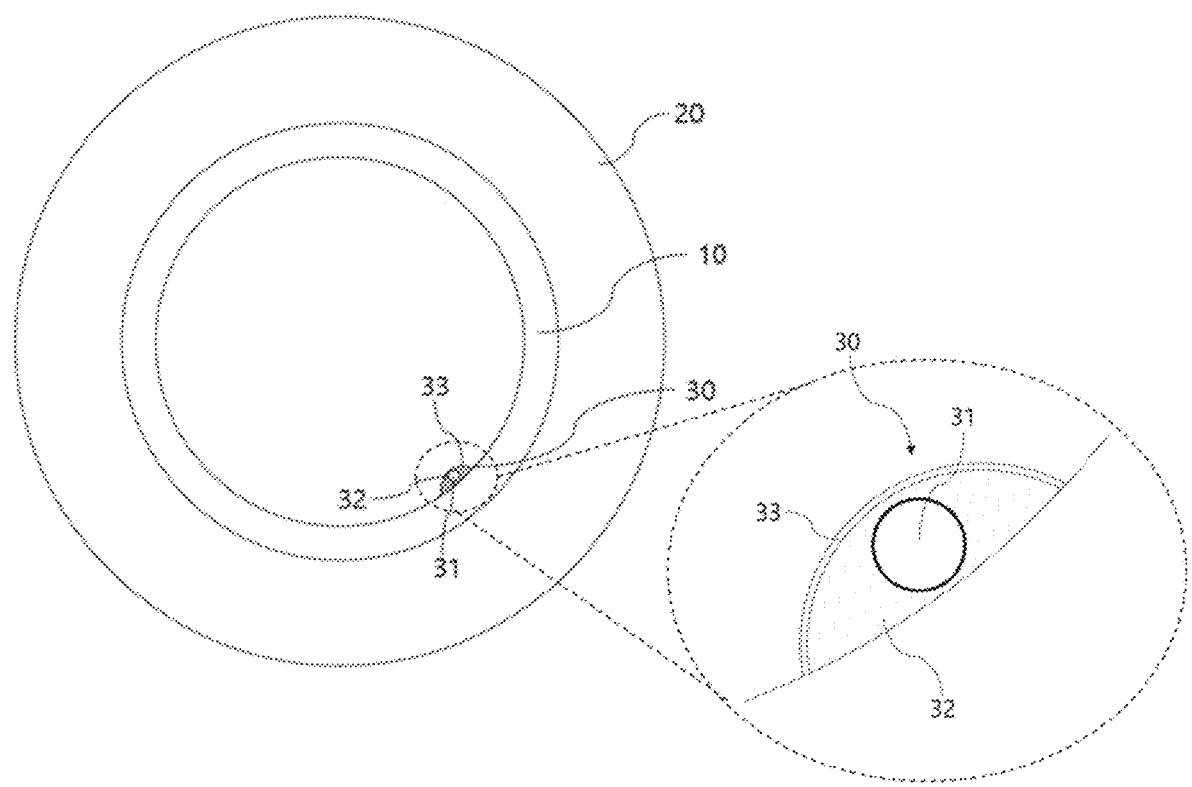
FIG. 2 is a cross-sectional view of the spirally heating submarine pipeline according to the first embodiment of the present invention.

As illustrated in FIG. 2, in the spirally heating submarine pipeline according to the first embodiment of the present invention, the heating unit 30 is formed in a semicircular form to protrude toward the center of the conduit 10 from an inner circumferential surface of the conduit 10 and the semicircular form is configured to be applied so that a fillet is applied to the end extending from the conduit 10. That is, the heating unit 30 itself is configured inward of the inner circumferential surface of the conduit 10 so that a distance between the fluid and the heating unit 30 is closer to improve the thermal conductivity, and due to the protruding spiral structure, turbulence is promoted to cause a flow improvement effect. Specifically, the heating unit 30 is located with the electric heating wire 31 and the heat insulating cap 33 along the edge of the heat insulator 32 surrounding the electric heating wire 31, and the heat insulating cap 33 may be separated or replaced for maintenance of the electrical heating wire 31.

First, according to the first embodiment of the present invention, the heating unit 30 is provided so as to be located close to the interior of the conduit 10, that is, the transporting fluid unlike the existing technology to have an effect of improving the thermal conductivity for increasing the temperature of the flow in the pipe.

Figure 6:
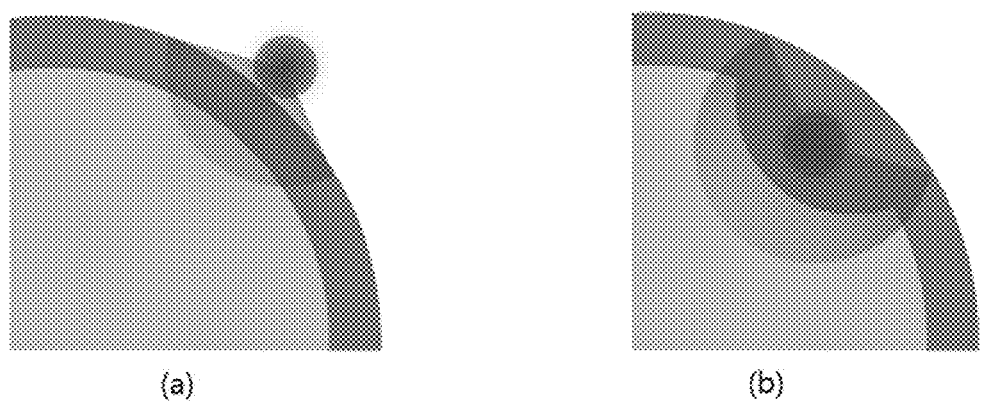
FIG. 6 is a diagram illustrating a comparison of thermal conductivity in a conventional ETH technique and a spirally heating submarine pipeline of the present invention.

FIG. 6 is a diagram illustrating comparison of heating units in the existing ETH technology and the present invention qualitatively or conceptually, wherein an arc indicating a range indicates a range in which the electrical heating wire may be applied by the thermal conductivity. In detail, compared to the existing ETH technology, the distance between the heating wire and the fluid was shorter, and it is expected that the range of the electric heating wire may become wider due to thermal conductivity to exhibit a sufficient effect.

To compare quantitatively and numerically, the improvement degree will be determined by using a Fourier Formula such as the following Equation 3 which is a thermal conductive equation.

$$Q = kA(T_1 - T_2)\frac{t}{s}$$ [Equation 3]

Here, K represents a thermal conductivity coefficient of 30, A represents a heat transfer area. T1 represents a heating wire temperature, T2 represents an internal flow temperature, t represents a taken time, and s represents a material thickness. The values for each variable are shown in Tables 1 to 3, and as a result, the calculated thermal conductivity amounts are shown in Table 4.

TABLE 1

|  | Plane | Spiral |
|---|---|---|
| k [W/m*K] | 35 | 35 |
| s [m] | 0.0285 | 0.0062 |
| T1 [K] | 350 | 350 |
| T2 [K] | 298.15 | 298.15 |

TABLE 2

| A | Plane | Spiral |
|---|---|---|
| 1 m | 0.028 | 0.038 |
| 20 ft | 0.169 | 0.223 |
| 40 ft | 0.389 | 0.458 |
| 60 ft | 0.505 | 0.687 |

TABLE 3

| t | Plane | Spiral |
|---|---|---|
| 1 m | 0.286 | 0.286 |
| 20 ft | 1.742 | 1.742 |
| 40 ft | 3.483 | 3.434 |
| 60 ft | 5.225 | 5.123 |

TABLE 4

| Q | Plane | Spiral | Q rate |
|---|---|---|---|
| 1 m | 509.40 | 3177.90 | 6.24 |
| 20 ft | 18742.85 | 113685.98 | 6.07 |
| 40 ft | 86283.64 | 460401.99 | 5.34 |
| 60 ft | 168020.20 | 1030101.10 | 6.13 |

The average thermal conductivity rise is calculated about 5.94 times, and although this numerical value itself is not meant, through this, it will be proved that the thermal conductivity of the spirally heating submarine pipeline may be improved.

Figure 7:
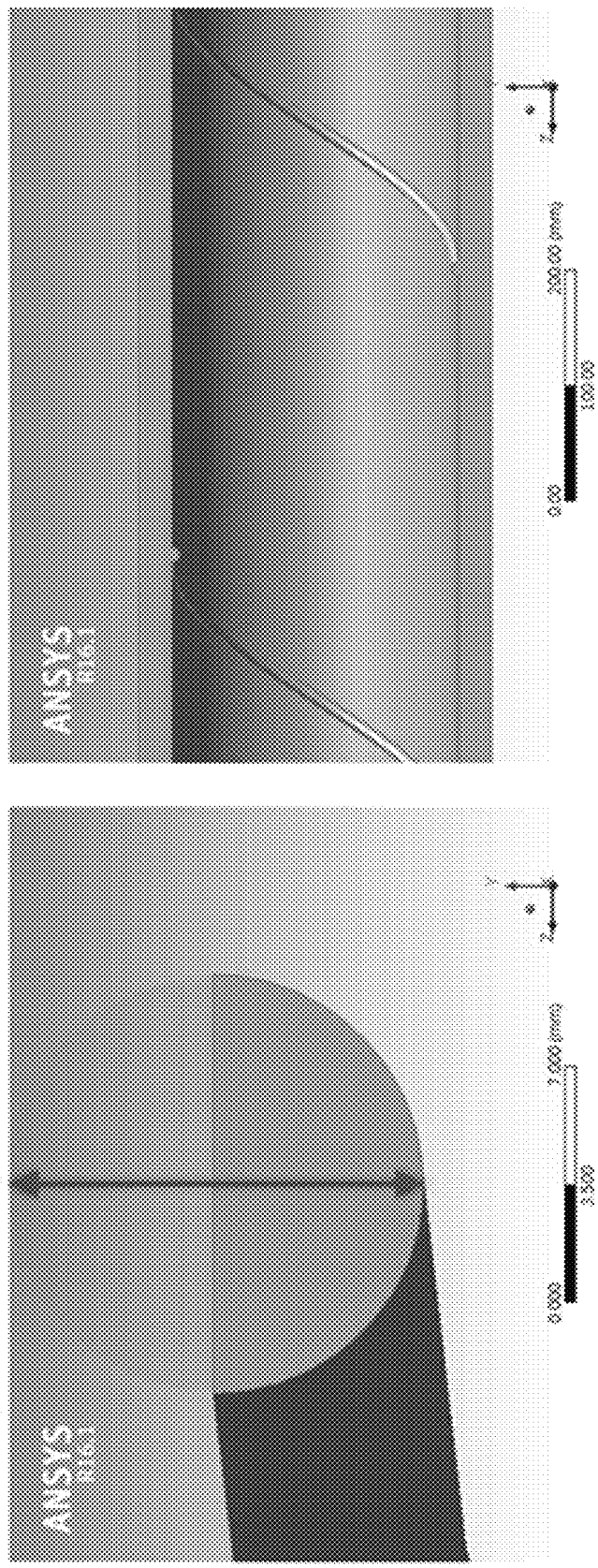
FIG. 7 is a diagram of modeling a spiral diameter of a spirally heating submarine pipeline according to the present invention.

In addition, the heating unit 30 is formed in a semicircular form, as illustrated in FIG. 7 described above, to be stable in terms of fatigue strength. The left side of FIG. 7 illustrates only a cross-sectional shape of only the heating unit 30 taken along a radial direction, and the right side of FIG. 7 illustrates a cross-sectional shape of the submarine pipeline including the heating unit 30 taken along a longitudinal direction. Since a drag coefficient varies depending on the shape and the stability is changed in terms of fatigue strength, as the corner is rounded, the corner has a lower drag coefficient value. Accordingly, the shape of the heating unit 30 was selected as a semicircular shape, not a rectangle or a triangle, which is stable in terms of the fatigue strength due to the low drag coefficient compared to other shapes.

In addition, the semicircular form of the heating unit 30 may be provided at 5% to 15% of the inner diameter of the conduit 10, and more preferably 5% of the inner diameter of the conduit 10. The diameter exceeding 15% of the inner diameter will have a great effect on the flow rate, and the diameter of less than 5% may not be easy to install the electric heating wire 31 therein.

Figure 8:
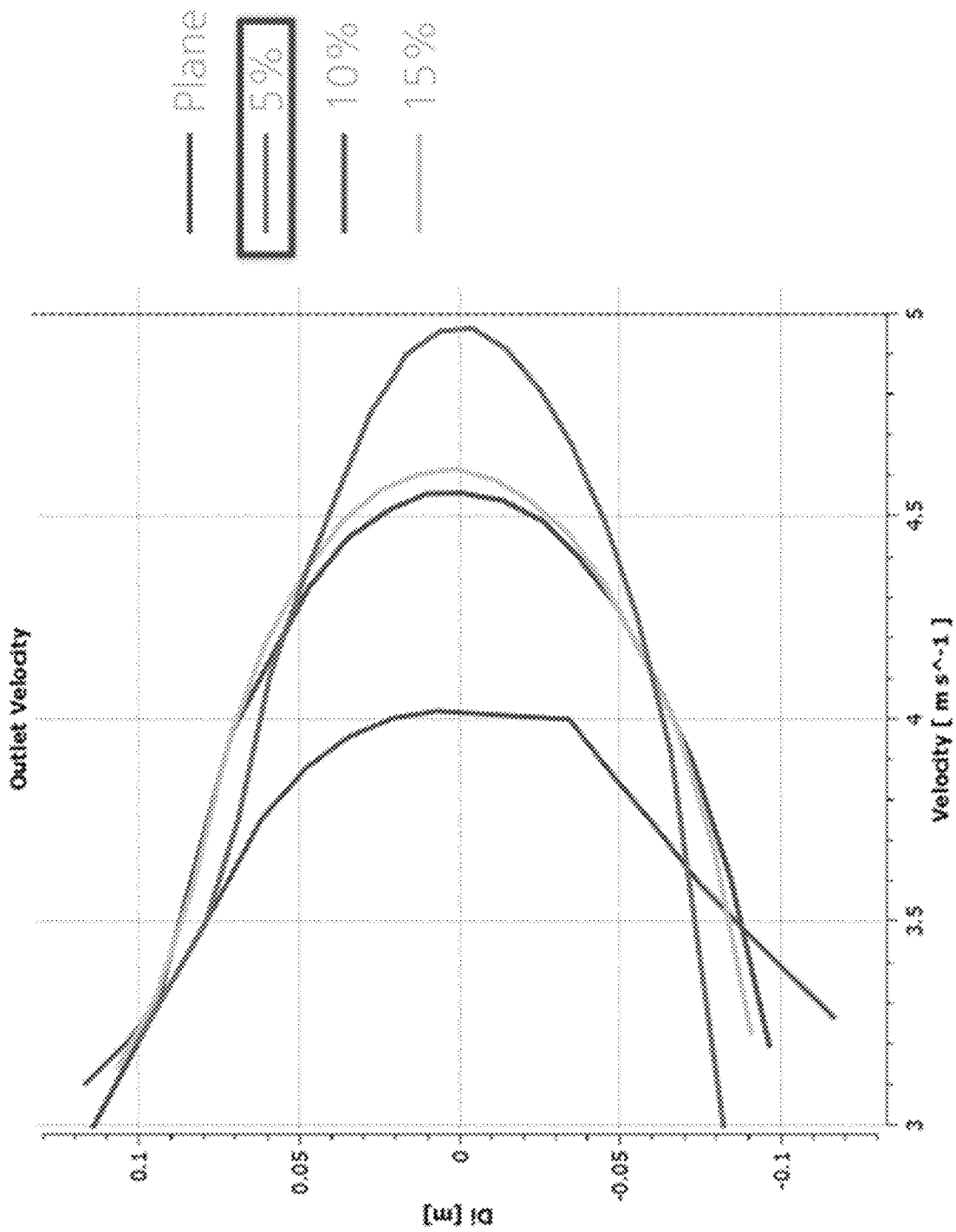
FIG. 8 is a graph showing a velocity profile according to a spiral diameter in a conventional pipeline and a spirally heating submarine pipeline according to the present invention.

On the other hand, the turbulence flow in the pipe is promoted by the spiral structure, and there is a shape difference of the velocity profile graph according to a pipe wall friction coefficient. The important point here is that in the case of a velocity slope in the vicinity of the pipe wall, the smooth pipe having a small friction coefficient is shaper than a rough pipe having a large friction coefficient. As a result, it may be considered that as the velocity slope in the vicinity of the pipe wall is sharper, the pipe wall friction coefficient is relatively small, and if the pipe wall friction coefficient is decreased, it is possible to improve a problem of pressure reduction directly affected by the pipe wall friction coefficient. FIG. 8 is a graph showing a velocity profile according to a spiral diameter of a conventional submarine pipeline and a spirally submarine pipeline according to the present invention. In detail, it can be seen that when the diameter of the heating unit 30 is 5% of the inner diameter of the conduit, the velocity increase in the pipe wall is largest and the most ideal in terms of the flow rate.

Figure 9:
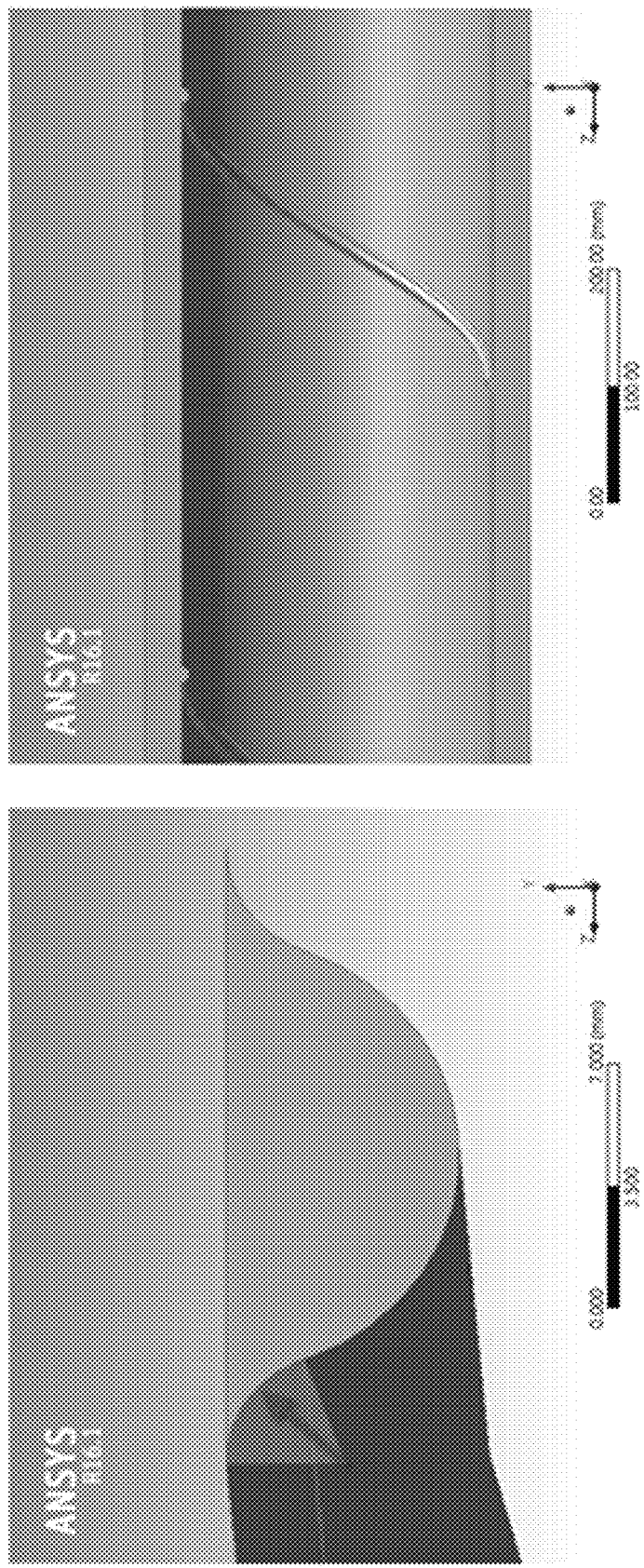
FIG. 9 is a diagram of modeling fillets formed at both ends of the spiral in the spirally heating submarine pipeline according to the present invention.

In the case of the fillet, as illustrated in FIG. 9, since a stress intensive effect occurs on a notch portion formed at both ends of the semicircle, the fatigue strength may be dangerous to be applied to both ends of the semicircle to minimize the notch portion. The radius of the fillet may be 25% to 50% of the semicircle of the heating unit 30, more preferably 25% of the semicircle. Through this structure, the fatigue strength of the heating unit 30 of the spiral structure may be obtained.

Figure 10:
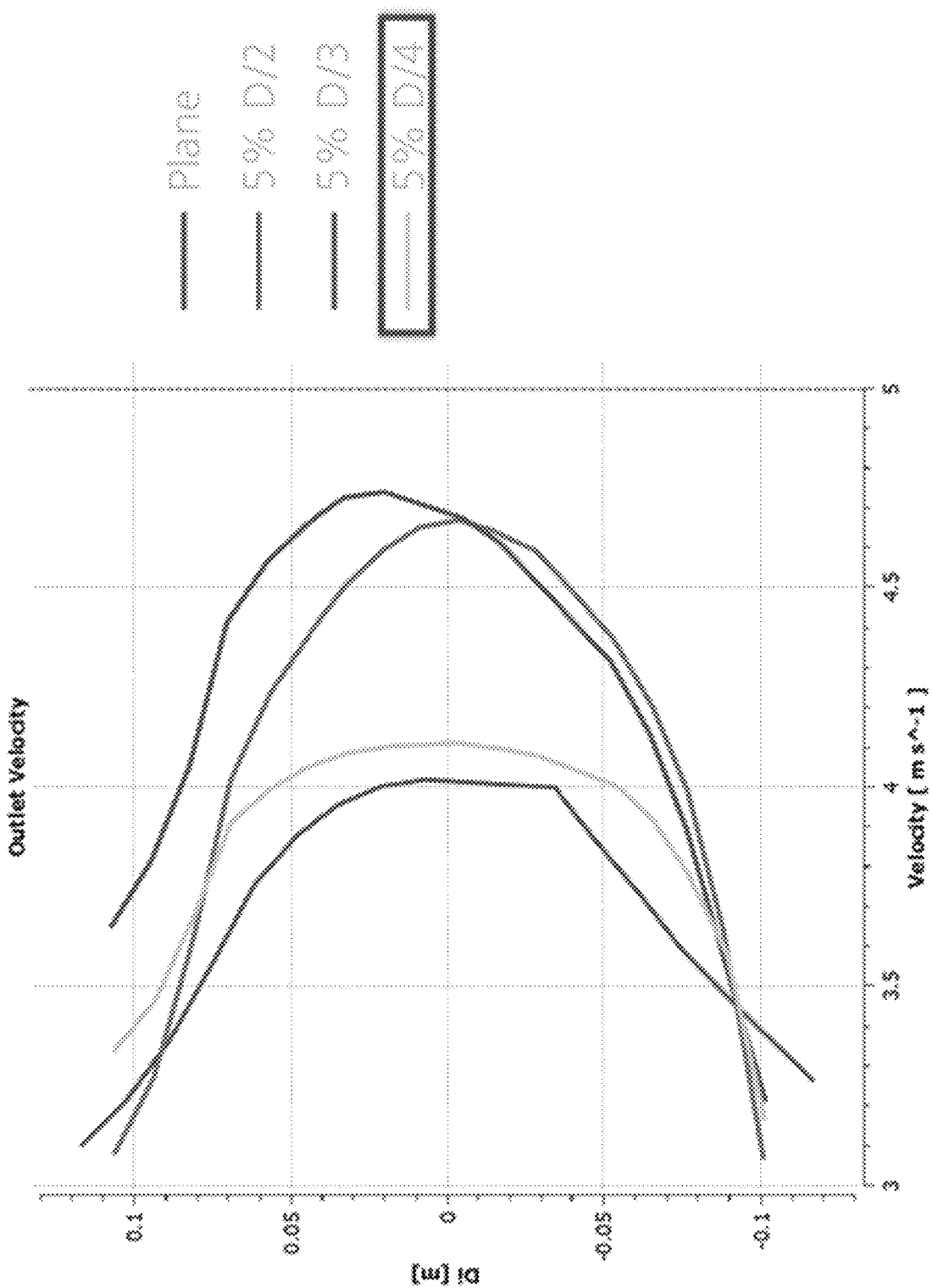
FIG. 10 is a graph showing a velocity profile according to a size of fillets formed at both ends of the spiral in a conventional pipeline and a spirally heating submarine pipeline according to the present invention.

FIG. 10 is a graph showing a velocity profile according to a fillet radius of a conventional submarine pipeline and a spirally submarine pipeline according to the present invention. As a result, when compared to FIG. 8, it can be proved that the fillet is effective to reduce the stress intensive effect of the notch portion, and when the radius of the fillet was 25% of the semicircle, the flow was most improved.

Figure 11:
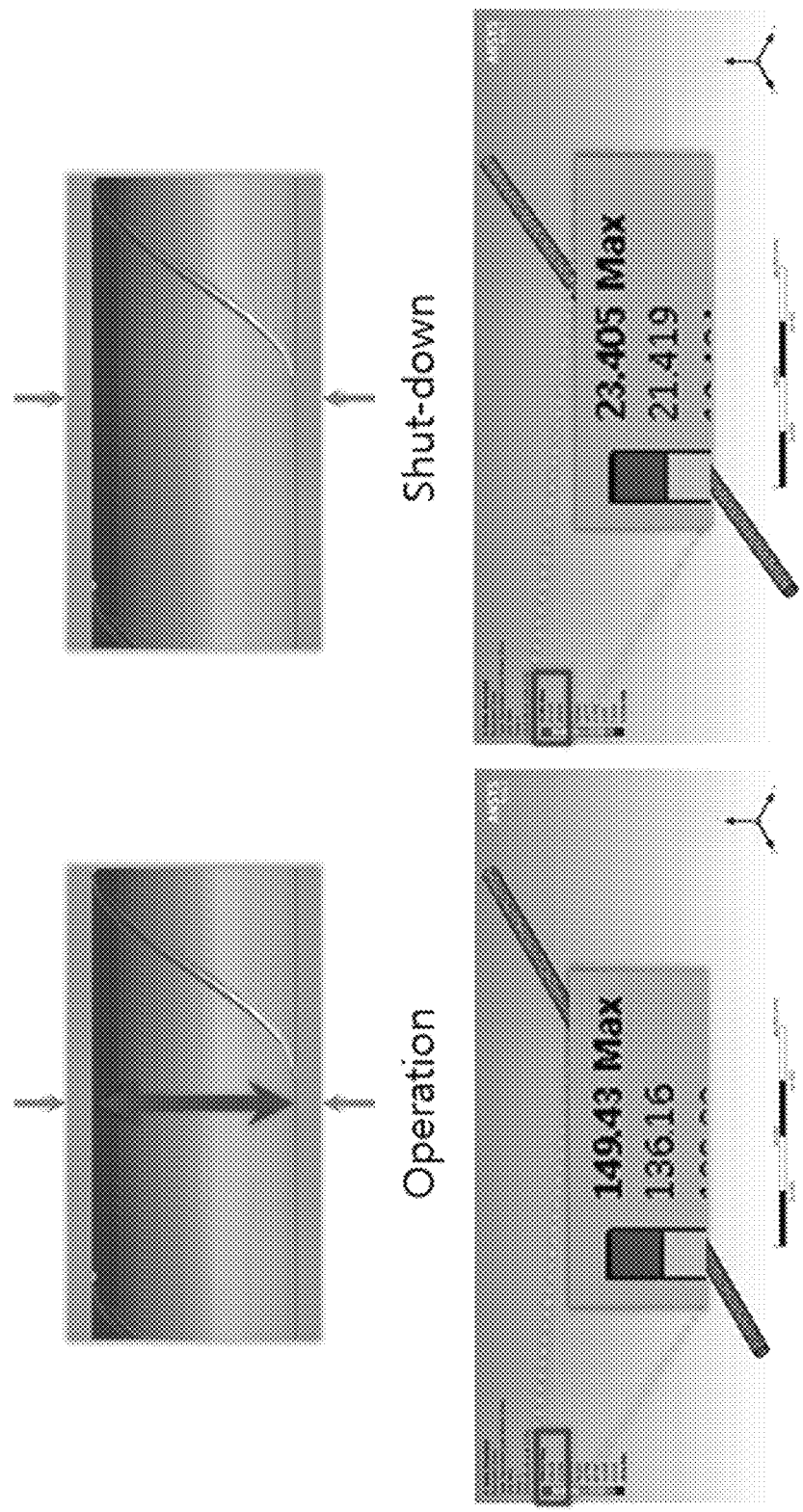
FIG. 11 is a diagram of modeling to calculate a maximum stress value for an 'Operation' situation and a 'Shut-down' situation of the spirally heating submarine pipeline according to the present invention.
Figure 12:
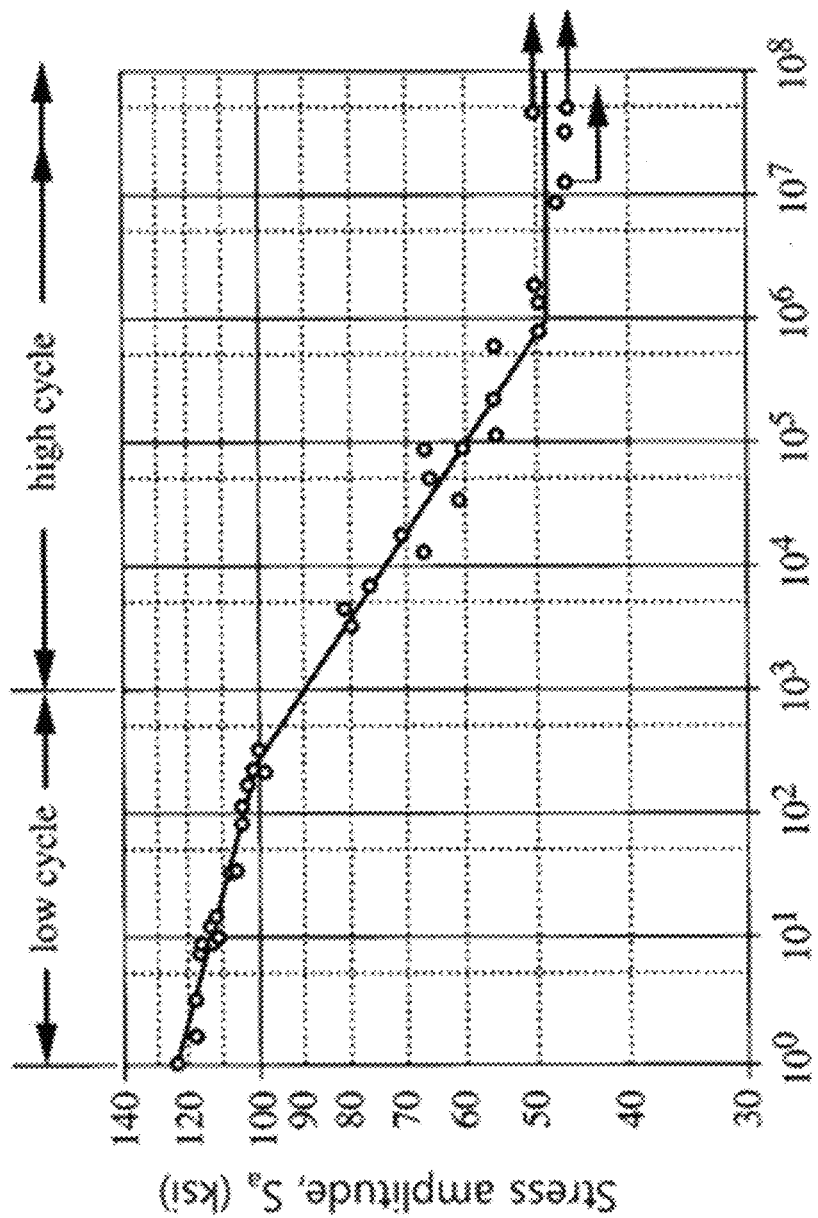
FIG. 12 is a fatigue curve of AISI 4130 steel that may be used as a material of the pipeline.

In addition, the heating unit 30 should be proven to be stable in terms of fatigue strength. Accordingly, the stress value for each situation is calculated by dividing an Operation situation and a Shut-down situation as illustrated in FIG. 11. As a result, the maximum stress was derived from 149.43 MPa, and as a result, compared to a fatigue curve of AISI 4130 used as the pipeline material of FIG. 12, the maximum stress value is 10.84 ksi when converted as a stress height which is a y axis of the fatigue curve, and it can be seen that this value does not reach even the minimum value of 30 ksi to be very stable in terms of fatigue strength. In addition, this value is also a very extreme condition to set an oil well pressure condition of 270 bar, and in the case of actual production, it is expected that the stress value is further reduced because the reduced pressure is performed.

Figure 3:
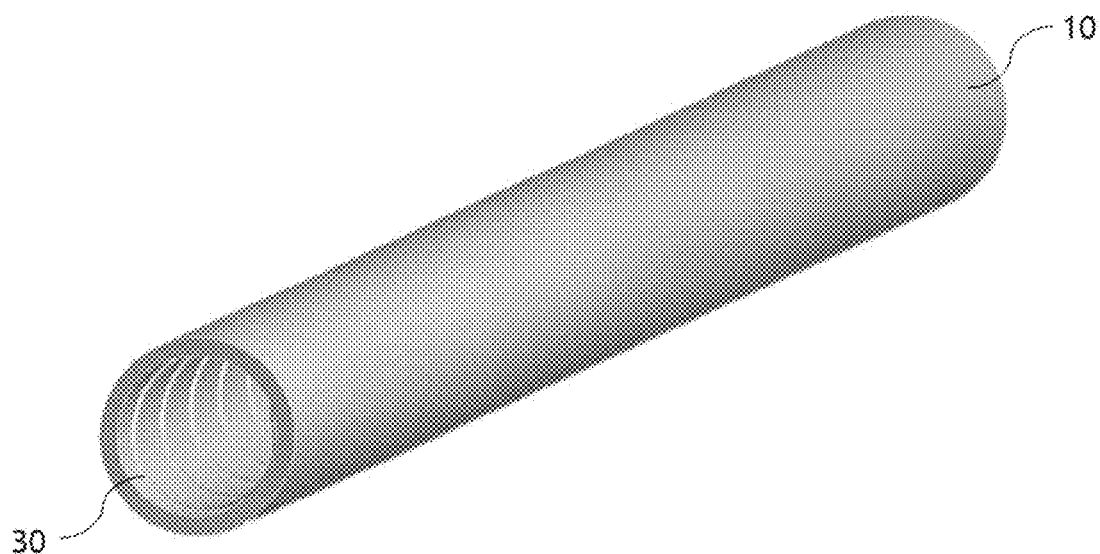
FIG. 3 is a perspective view of a spirally heating submarine pipeline according to a second embodiment of the present invention.
Figure 4:
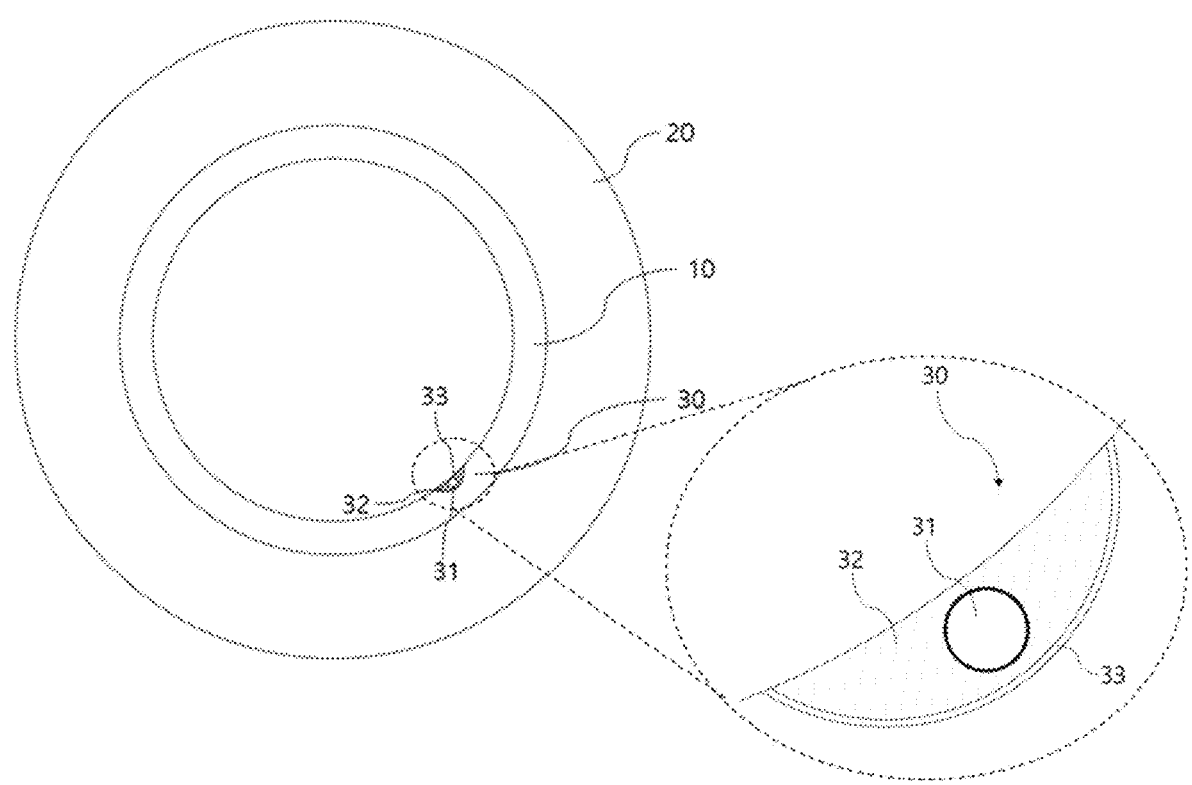
FIG. 4 is a cross-sectional view of the spirally heating submarine pipeline according to the second embodiment of the present invention.

As illustrated in FIGS. 3 and 4, in a spirally heating submarine pipeline according to a second embodiment of the present invention, the inner circumferential surface of the conduit 10 is applied to a denting technology (generating a specific concave shape on the surface) as the spiral structure and the heating unit 30 may be installed in a form inserted into the inner circumferential surface in the spiral structure of the conduit. Specifically, the electric heating wire 31 and the heat insulator 32 are located inside the pipe wall of the conduit 10, which is a structure separated from the fluid in the conduit 10 by the heat insulating cap 33 formed to coincide with the inner circumferential surface of the conduit 10.

Like the first embodiment, in the second embodiment, since the fluid and the heating unit 30 are positioned more adjacent to each other than a conventional structure, the thermal conductivity may be improved compared to the related art. Further, since the heating unit 30 of the second embodiment is not a structure protruding from the inner circumferential surface of the conduit 10, of course, the fatigue strength will be stable, but unlike the first embodiment, in terms of flow improvement, it will not be able to expect an improvement effect similarly to the conventional pipeline. However, the structure according to the second embodiment is a method through denting when manufacturing the conduit 10, compared to the first embodiment, the equipment investment cost may be relatively reduced in terms of manufacturing. Accordingly, the spirally heating submarine pipeline according to the second embodiment may relatively complement the disadvantages of the flow by using the flow for smooth fluid transportation in a gas form.

Figure 5:
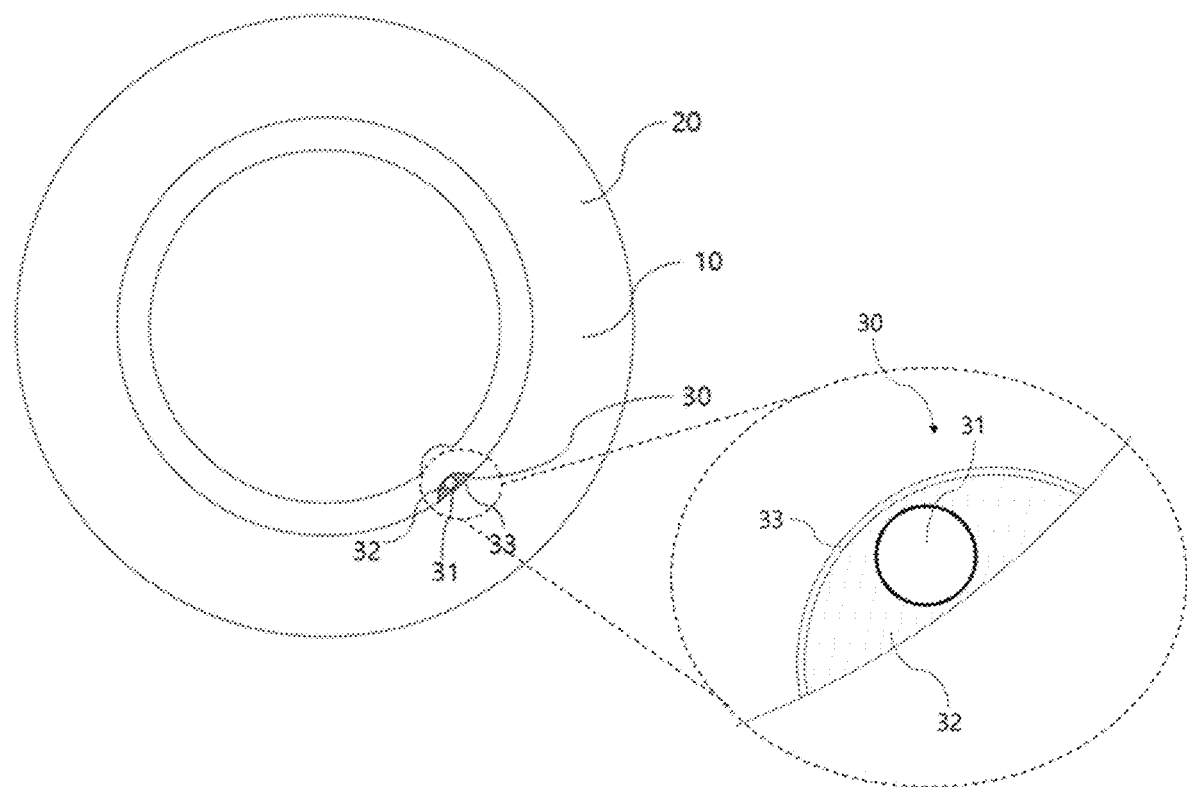
FIG. 5 is a cross-sectional view of a spirally heating submarine pipeline according to a third embodiment of the present invention.

As illustrated in FIG. 5, in a spirally heating submarine pipeline according to a third embodiment of the present invention, the outer circumferential surface of the conduit 10 is applied to a denting technology (generating a specific concave shape on the surface) as the spiral structure and the heating unit 30 may be installed in a form inserted into the outer circumferential surface in the spiral structure of the conduit. Specifically, the electric heating wire 31 and the heat insulator 32 are located inside the pipe wall of the conduit 10, which is a structure separated from the fluid in the conduit 10 by the heat insulating cap 33 formed to coincide with the outer circumferential surface of the conduit 10. Here, the conduit 10 is provided to protrude from the inner circumferential surface of the conduit 10 to the center of the conduit 10 in the same shape as the heating unit 30 so that the thickness of the pipe wall is constantly maintained. In addition, the protruding portion may be applied to the fillet at the end extending from the inner circumferential surface of the conduit 10 for the stability of the fatigue strength.

In the third embodiment, the heating unit may be spaced apart from the fluid as compared with the first embodiment and the second embodiment, but since the fluid and the heating unit 30 are located more adjacent to each other than the related art, the thermal conductivity may be improved as compared with the related art. In addition, since the heating unit 30 in the third embodiment protrudes from the inner circumferential surface of the conduit 10 in the same shape as the heating unit 30 for the flow improvement similarly to the first embodiment, similarly, it will not be able to expect an improvement effect. Even in this structure, a fillet structure applied to the first embodiment was used to stably maintain the fatigue strength. At this time, in the semicircular structure disposed on the inner circumferential surface of the conduit 10 and the fillet size, like the first embodiment, preferably, the semicircular shape may be 5% of the internal diameter of the conduit 10, and the fillet may be 25% of the semicircular shape. However, the structure according to the third embodiment is the structure to process both inner and outer circumferential surfaces of the conduit 10, and thus, compared to the second embodiment, the equipment investment costs may be relatively increased in terms of manufacturing, but the maintenance of the electric heating wire 31 may be very facilitated through the heat insulating layer 20 and the heat insulating cap 33. Accordingly, the spirally heating submarine pipeline according to the third embodiment is provided for a relatively long period of time to be applied to a pipeline requiring periodic maintenance, and thus, compared to the conventional technique, it is possible to maximize the advantages of easy maintenance while improving the thermally conductivity and the fluid flow.

Figure 13:
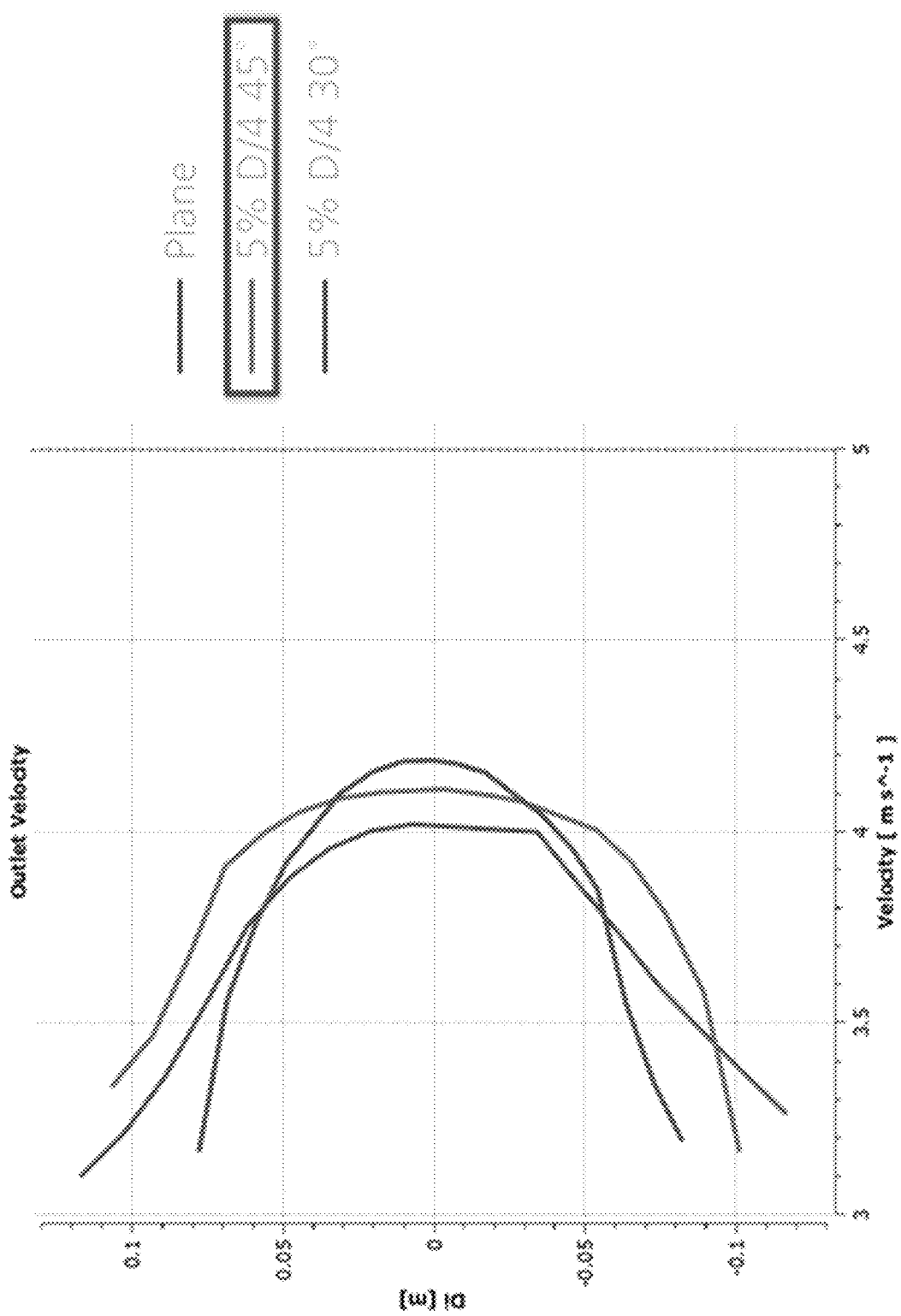
FIG. 13 is a graph showing a velocity profile according to a distance between spirals in a conventional pipeline and a spirally heating submarine pipeline according to the present invention.

In the spirally heating submarine pipelines according to the first to third embodiments of the present invention, in the spiral structure of the heating unit 30, since the distance between the spirals is formed twice the diameter of the conduit, an angle with a horizontal axis may be 45°. In the case of the distance between the spirals, the spiral was set at an angle formed with the horizontal axis and represented again as a concept of a pitch. That is, a final case of 5% D/4 was simulated by dividing 45° (1 pitch=2*conduit inner diameter) and 30° (1 pitch=3.46*conduit inner diameter), and FIG. 13 illustrates a velocity profile graph according to a spiral distance in the conventional submarine pipeline and the spirally submarine pipeline of the present invention. As a result, since the case of 45° exhibited a form more similar to the smooth pipe compared to the case of 30°, it can be seen that 45° is more effective in terms of thermal conductivity improvement.

Figure 14:
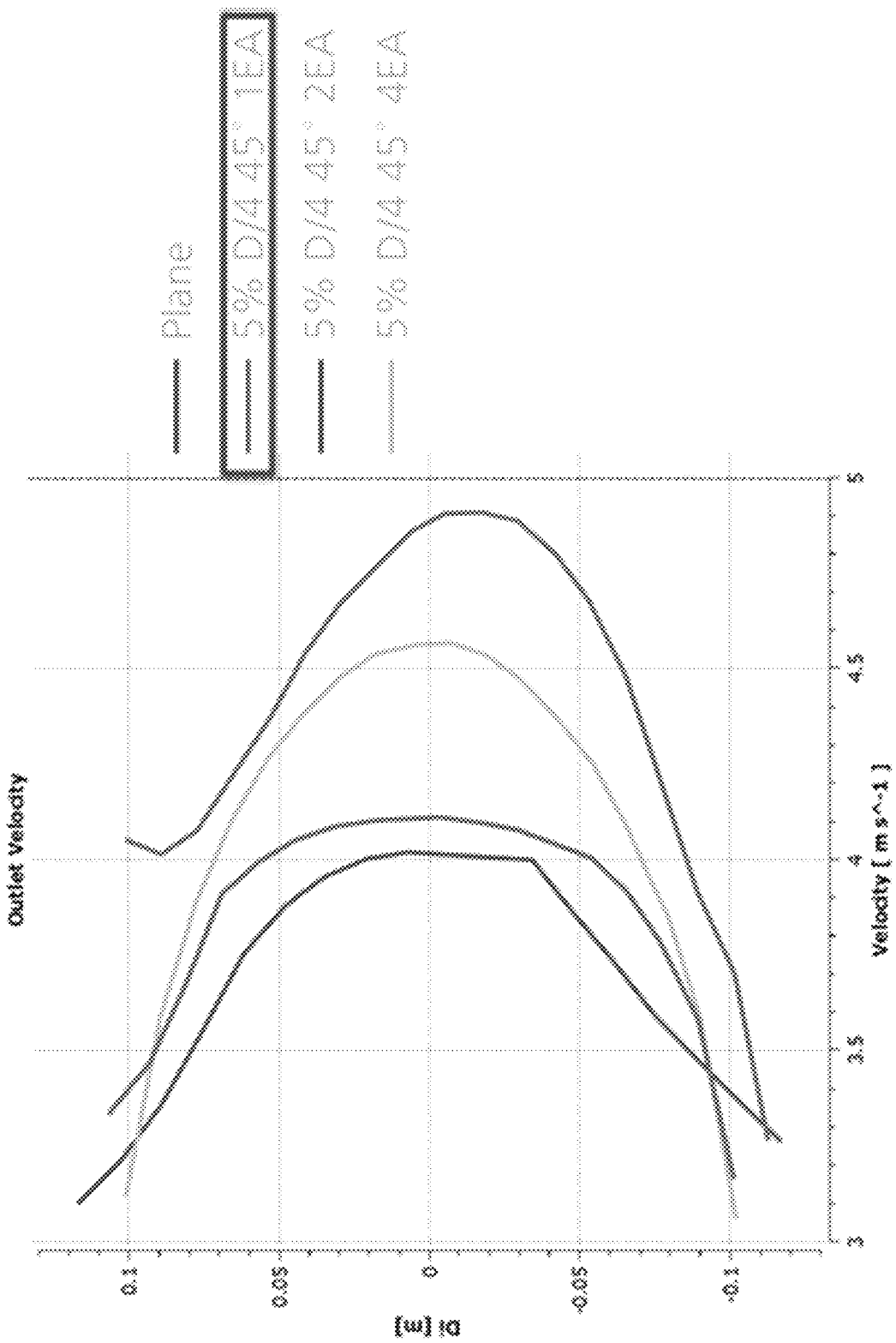
FIG. 14 is a graph showing a velocity profile according to the number of spirals in a conventional pipeline and a spirally heating submarine pipeline according to the present invention.
Figure 15:
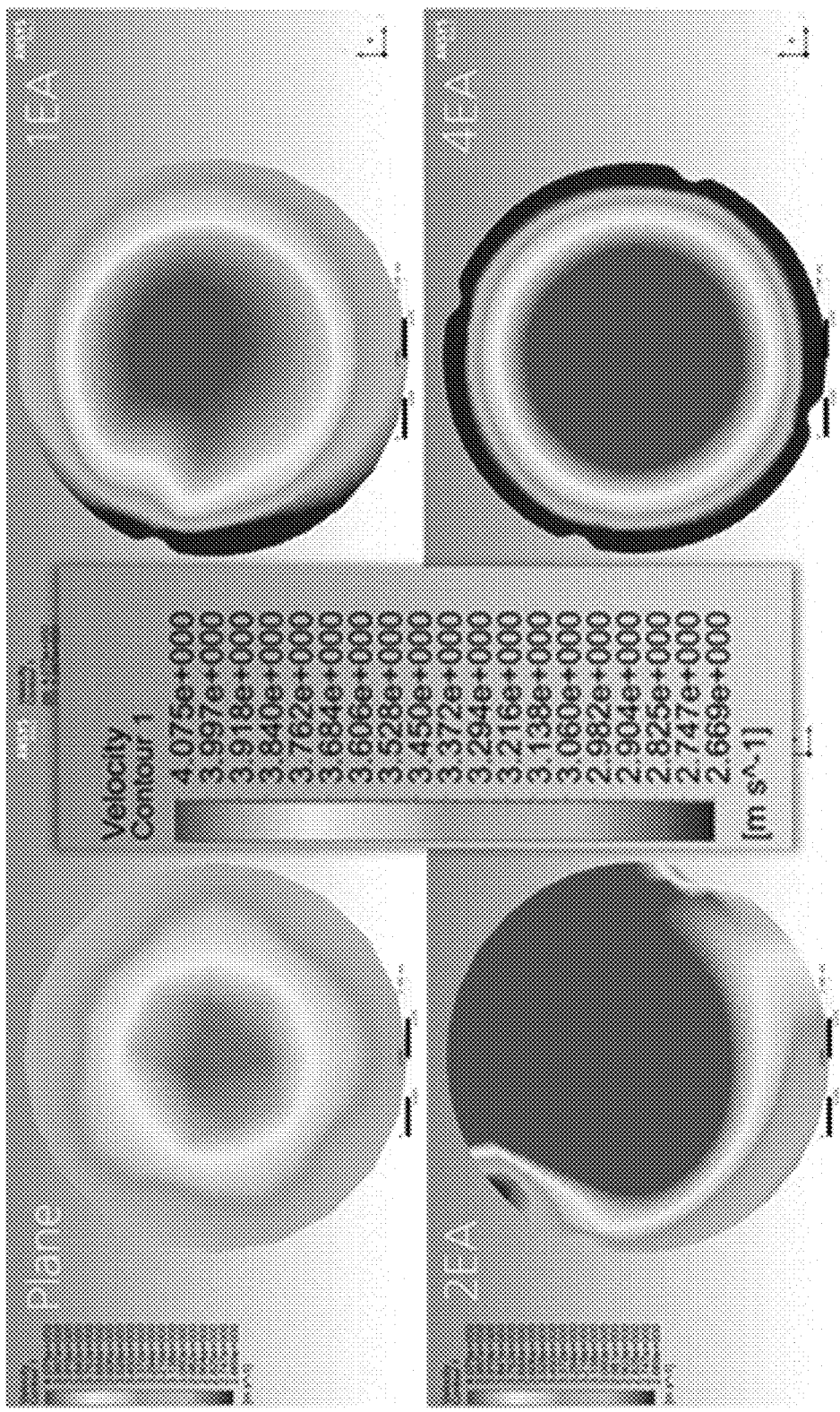
FIG. 15 is a diagram of modeling a velocity profile according to the number of spirals in a conventional pipeline and a spirally heating submarine pipeline according to the present invention.

Further, in the spirally heating submarine pipelines according to the first to third embodiments of the present invention, the spiral structure of the heating unit 30 may have the number of spirals of 1. In the case of the number of spiral structures, for the final case of 5% D/4 45°, simulation was performed by dividing two spiral structures, which are additionally 180° symmetrical with the existing number of 1, and four spiral structures having a distance of 90°. FIG. 14 illustrates a velocity profile graph according to a spiral distance in a conventional pipeline and a spirally heating submarine pipeline according to the present invention and FIG. 15 illustrates a CFD analysis form. As a result, since the case of the number of 1 exhibited a form more similar to the smooth pipe compared to the case of the number of 2, it can be seen that the number of 1 is more effective in terms of flow improvement.

Figure 16:
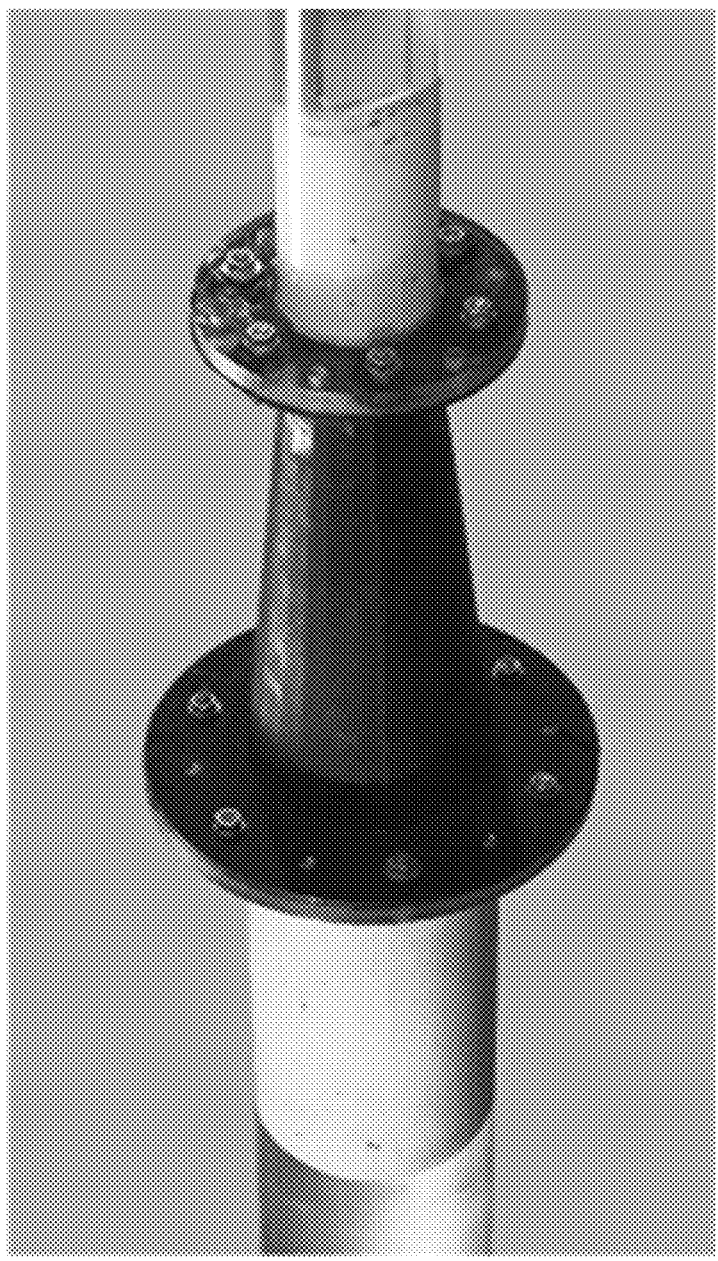
FIG. 16 is a diagram illustrating Gel Pig for maintenance of a spirally heating submarine pipeline according to the present invention.

On the other hand, the spirally heating submarine pipeline according to the present invention shows a significant improvement in the thermal conductivity and the flow aspect as described above, and the fatigue strength is also stable, so that there is differentiation with existing techniques. However, there is a limit in pigging, which is important maintenance in the submarine structure. In the case of conventional pigging equipment, a structure having no contraction and expansion functions is formed, and may not be applied to the heating submarine pipeline of the present invention in which the spiral structure is present in the pipe. In order to overcome this point, the maintenance of the spirally heating submarine pipeline according to the present invention may use Gel Pig as illustrated in FIG. 16. The Gel Pig is to perform pigging by contraction and expansion properties, and as a result, the pipe wall and the spiral structure in the pipe are not damaged to prevent the general pigging and clean a high-risk pipeline, and even if the Gel Pig is damaged, there is no problem in performing the pigging. Further, an emission unit and a receiver are not separately required, and the bypassing flow rate is reduced to reduce the equipment investment costs.

As described above, it will be understand to those skilled in the art that a technical configuration of the present invention can be easily executed in other detailed forms without changing the technical spirit or an essential feature thereof.

Therefore, the embodiments described as above are exemplary in all aspects and should be understood as not being restrictive and the scope of the present invention is represented by claims to be described below rather than the detailed description, and it is to be interpreted that the meaning and scope of the claims and all the changes or modified forms derived from the equivalents thereof come within the scope of the present invention.

The invention claimed is:

1. A spirally heating submarine pipeline comprising:
 a conduit which transports a high temperature high pressure fluid from a submarine oil well; and
 a heating unit disposed in a spiral structure inside an inner circumferential surface of the conduit,
 wherein the heating unit includes an electric heating wire that is installed along the spiral structure to generate heat; a heat insulator that is installed in a form of fully surrounding the electric heating wire and preserves the generated heat; and a heat insulating cap for isolating the heat insulator from the conduit or the heat insulating layer and is provided so as to increase the temperature of the flow in the pipe to prevent the production of a pipe flow interfering material when the fluid is transported in the conduit, and
 wherein the heating unit is installed in a form of being inserted into the inner circumferential surface of the conduit dented in the same shape as the spiral structure and the heat insulating cap is formed to coincide with the inner circumferential surface of the conduit to separate the electric heating wire and the heat insulator located in the pipe wall of the conduit from the fluid in the pipe.

2. The spirally heating submarine pipeline of claim 1, wherein in the spiral structure, a distance between spirals is formed twice the diameter of the conduit, so that an angle with a horizontal axis is 45°.

3. A spirally heating submarine pipeline comprising:
 a conduit which transports a high temperature high pressure fluid from a submarine oil well; and
 a heating unit disposed in a spiral structure inside an outer circumferential surface of the conduit,
 wherein the heating unit includes an electric heating wire that is installed along the spiral structure to generate heat; a heat insulator that is installed in a form of fully surrounding the electric heating wire and preserves the generated heat; and a heat insulating cap for isolating the heat insulator from the conduit or the heat insulating layer and is provided so as to increase the temperature of the flow in the pipe to prevent the production of a pipe flow interfering material when the fluid is transported in the conduit, and
 wherein the heating unit is installed in a form of being inserted into the outer circumferential surface of the conduit dented in the same shape as the spiral structure and the heat insulating cap is formed to coincide with the outer circumferential surface of the conduit to separate the electric heating wire and the heat insulator located in the pipe wall of the conduit from the heat insulating layer, the conduit is provided to protrude from the inner circumferential surface of the conduit to the center of the conduit in the same shape as the heating unit.

4. The spirally heating submarine pipeline of claim 3, wherein in the spiral structure, a distance between spirals is formed twice the diameter of the conduit, so that an angle with a horizontal axis is 45°.

* * * * *